US012578037B2

(12) United States Patent
Delame-Quentin et al.

(10) Patent No.: US 12,578,037 B2
(45) Date of Patent: Mar. 17, 2026

(54) METHOD FOR BINDING A CABLE BUNDLE USING SIMPLE STRIP BINDINGS

(71) Applicant: LATELEC, Toulouse (FR)

(72) Inventors: Cyrille Delame-Quentin, Toutens (FR); Julien Mourieras, Labège (FR)

(73) Assignee: LATELEC, Toulouse (FR)

( * ) Notice: Subject to any disclaimer, the term of this patent is extended or adjusted under 35 U.S.C. 154(b) by 91 days.

(21) Appl. No.: 18/292,014

(22) PCT Filed: Jul. 25, 2022

(86) PCT No.: PCT/EP2022/070815
    § 371 (c)(1),
    (2) Date: Jan. 25, 2024

(87) PCT Pub. No.: WO2023/006675
    PCT Pub. Date: Feb. 2, 2023

(65) Prior Publication Data
    US 2024/0328541 A1     Oct. 3, 2024

(30) Foreign Application Priority Data
    Jul. 26, 2021    (FR) ........................................ 2108101

(51) Int. Cl.
    *F16L 3/233*          (2006.01)
    *H02G 1/00*           (2006.01)
(52) U.S. Cl.
    CPC ................ *F16L 3/233* (2013.01); *H02G 1/00* (2013.01)
(58) Field of Classification Search
    CPC . F16L 3/233; F16L 3/137; H02G 1/00; H02G 3/305; H02G 3/266; Y10T 24/14;
    (Continued)

(56) References Cited

U.S. PATENT DOCUMENTS 3,284,038 A * 11/1966 Udry ........................ F16L 3/233
                                                        248/74.3
5,896,623 A *  4/1999 Martin .................... F16L 3/233
                                                        24/3.13
(Continued)

FOREIGN PATENT DOCUMENTS

EP            1569856           7/2012
GB            2528928           2/2016
(Continued)

OTHER PUBLICATIONS

International Search Report for application No. PCT/EP2022/070815 dated Nov. 14, 2022.
(Continued)

*Primary Examiner* — Jack W Lavinder
(74) *Attorney, Agent, or Firm* — Perman & Green, LLP

(57) ABSTRACT

A method for binding a cable bundle using simple strip bindings, where producing a binding includes lacing the strip around the bundle and producing a stop by adhesively bonding the lacing to itself by applying at least one glue dot to the strip once the lacing has been carried out, without a self-locking knot being formed. A piece of looped strip is wound around the cable bundle, the two strands of the strip are introduced into the loop, a glue dot is deposited onto the strands close to the loop, and the strands are pulled to trap the glue dot between the strands and the peak of the loop. Eliminating self-locking knots gains time in the production of the bindings, limits the risk of MSDs in operators, and to automates the process increasing productivity and reducing both the amount of binding strip required and the amount of offcuts.

11 Claims, 2 Drawing Sheets

(58) Field of Classification Search
CPC ............. Y10T 24/1402; Y10T 24/1404; Y10T 24/141
USPC ...... 206/443; 224/901.2; 29/525.13, DIG. 1; 53/399, 586, 590, 592
See application file for complete search history.

(56) References Cited

U.S. PATENT DOCUMENTS

| | | | | |
|---|---|---|---|---|
| 8,910,347 | B1 * | 12/2014 | Wilcox | B65D 63/109 24/30.5 R |
| 2003/0041417 | A1 * | 3/2003 | Smith | F16L 3/233 24/16 R |
| 2006/0213080 | A1 * | 9/2006 | Sussman | A43B 3/105 36/12 |
| 2009/0050265 | A1 * | 2/2009 | Otsubo | B29C 66/742 428/375 |
| 2012/0037766 | A1 * | 2/2012 | Buras, Jr. | F16L 3/233 248/65 |
| 2017/0247153 | A1 * | 8/2017 | Tribbett | B65D 63/109 |

FOREIGN PATENT DOCUMENTS

| | | |
|---|---|---|
| JP | 2004009767 | 1/2004 |
| RU | 2015144039 | 4/2017 |

OTHER PUBLICATIONS

Anonymous, AeroElectric Connection, "Bob's Shop Notes: Wire Bundle Tying Techniques", http://www.aeroelectric.com/, Dec. 24, 2002, Retrieved from the Internet: https://web.archive.org/web/20021224174121/http://www.aeroelectric.com/articles/cable_lace/cable_lace.html, [retrieved on Apr. 8, 2022], XP055910893.

* cited by examiner

METHOD FOR BINDING A CABLE BUNDLE USING SIMPLE STRIP BINDINGS

CROSS REFERENCE TO RELATED APPLICATIONS

This application is a National Stage of International Application No. PCT/EP2022/070815, having an International Filing Date of 25 Jul. 2022, which designated the United States of America, and which International Application was published under PCT Article 21(2) as WO Publication No. 2023/006675 A1, which claims priority from and the benefit of French Patent Application No. 2108101 filed on 26 Jul. 2021, the disclosures of which are incorporated herein by reference in their entireties.

BACKGROUND

Field

This application relates to the production of electrical harnesses. The disclosure relates more precisely to the production of bindings for assembling a cable bundle.

Throughout the description, the expression "cable bundle" is used to designate a set of electrical wires or cables assembled together. Such a bundle is sometimes also called an "electrical strand", whether the cables are twisted together to form a twist or run parallel to each other. "Electrical harness" is also considered to designate a set of cable bundles installed in an aircraft or other machine.

Brief Description of Related Developments

In a cable bundle, the cables are usually assembled together by bindings or clamps. Various binding techniques are known, all of which have their advantages and disadvantages.

The knotted wire binding technique is the most widespread. Use is preferentially made of a flat band or a narrow strip (rather than a round wire) so as not to risk shearing the cable casing.

EP1569856B1 discloses another technique using fastening bands covered with mechanical attachment elements of the buckle and hook type (the buckles are disposed on the first face of the band and the hooks on the second face). A flexible material, for example a glue, is also present on one of the faces of the band in the form of scattered spots or lines. The bindings obtained have the disadvantage of being thick and easily attaching to surrounding elements (other bundles, structural elements of the aircraft, insulating mats, etc.), which makes the installation of the bundles in an aircraft (or other device) more delicate. In addition, the bands used are expensive and, in the case where the flexible material is adhesive, its presence on one of the faces of the bands prevents them from being prepared upstream and packaged in the form of a long reel. Furthermore, the rigidity of the bands proposed by EP1569856B1 limits their use to the assembly of large diameter bundles.

GB2528928 offers another type of link, comprising a band-shaped body of constant width and a head of larger width. The head has two portions separated by a fold line: a first portion on the side of the body which is provided with a slot into which the free end of the body can be inserted, and an adhesive portion on the side opposite the body, initially covered with a removable sheet. To assemble a bundle, the body of the link is wound around the bundle and the free end of the body is passed through the slot in the first portion of the head, then the removable sheet protecting the adhesive is removed and the second portion of the head is folded, folded back and adhesively bonded to the first portion, thereby trapping the free end of the body at the slot.

Such a link is expensive to make. Its installation around the bundle requires care and cannot be done in a few seconds. Furthermore, this bond, which is made of paper and is designed to be tearable, is fragile; in addition, it cannot be used in an environment subject to high temperatures.

It is also known to use automatic clamps made of plastic material. However, such clamps are only suitable for cable bundles with a diameter greater than 5 mm or for bundle assemblies. Also and above all, these clamps have a protruding head which hinders the installation of the harnesses in the aircraft areas because it can get trapped in another system or tear the insulation mats along which the harnesses are arranged.

In the case of a cable bundle intended for the aeronautical industry, the use of automatic clamps is therefore not recommended or even prohibited.

Aeronautical cable bundles are therefore essentially assembled with knotted bindings, which have the advantage of not risking damage to other systems and of facilitating the installation of the harnesses. Various techniques are known, such as simple binding, characterized by independent bindings, or continuous binding characterized by successive bindings formed without interruption of the wire, reserved essentially for rectilinear or branching areas.

Producing a simple binding comprises the following steps:

a lacing phase consisting in winding the strip around the cable bundle; it is possible to go around the cable bundle several times before tying the strip, forming a capstan knot, a first tightening, producing a stop by simple node, a second tightening, cutting the strands of the strip.

The production of such a strip binding is carried out manually; it is not automated.

Lacing and forming the binding knots generates a significant amount of labor since the creation of a binding by an experienced operator takes approximately 18 seconds.

In addition, the bindings thus produced use a significant length of strip and generate significant offcuts, which also increases the manufacturing costs of the cable bundles.

Furthermore, this task causes significant musculoskeletal disorders for operators.

SUMMARY

The disclosure aims at overcoming at least one of the aforementioned disadvantages, by providing a method for binding a cable bundle using strip bindings which is simpler, faster and more economical than known methods, while guaranteeing the production of solid and correctly tightened bindings. Another purpose of the disclosure is to provide a method which can be automated.

For this purpose, the disclosure proposes a method for binding a cable bundle using simple strip bindings, wherein producing a binding comprises lacing the strip around the bundle and tightening the lacing. The method is characterized in that:

once the lacing has been carried out, a first glue dot is deposited onto the strip to produce a stop by adhesively bonding the lacing to itself, and in that no self-locking knot is formed.

Preferably, no stop knot, neither attachment knot nor buckle knot is produced in the method according to the disclosure.

Eliminating self-locking knots makes it possible to gain a considerable amount of time in the production of the bindings and to limit the risk of musculoskeletal disorders in operators.

Furthermore, the method can be automated, which results not only in an increase in productivity and the total elimination of musculoskeletal disorders in operators, but also in a reduction in the amount of binding strip required and the amount of offcuts.

Furthermore, the elimination of self-locking nodes reduces the radial bulk of the binding.

In addition, adhesively bonding the lacing to itself prevents the binding from sliding along the bundle thanks to the extension of the adhesive bonding area by capillary action under the binding.

Note that the term "strip" designates, in the context of the disclosure, both a flat wire and a round wire or even a textile band, for example a band of woven synthetic fibers such as Nomex® fibers which have the advantage of very low combustibility and high stability at high temperatures.

Once the lacing has been carried out, the strip has a part of strip wound around the bundle and a free part. According to a possible feature of the disclosure, the first glue dot is deposited onto the part of strip wound around the bundle, and the free part of the strip is folded back onto the first glue dot, producing the stop by adhesively bonding the lacing on itself.

According to one possible feature, lacing the strip around the cable bundle consists in forming a sliding link around the cable bundle, and the lacing is adhesively bonded to itself by the first glue dot at the sliding link.

In a particularly simple and rapid aspect, the sliding link is produced as follows. Lacing the strip around the bundle consists in forming a loop delimited by two strands with a piece of strip of predetermined length, folding the piece of strip in two, winding the piece of looped strip around the cable bundle and introducing the two strands of the strip into the loop, tightening the lacing then consisting in pulling on the two strands.

In this aspect, at least two alternatives are possible concerning stopping the lacing by adhesive bonding.

According to a first alternative, once the two strands have been introduced into the loop, the first glue dot is deposited onto the strands near the peak of the loop, on the side of said peak, that is to say onto the portion of strip surrounding the bundle, then the lacing is tightened by pulling on the two strands, the first glue dot thus becoming trapped between the strands and the peak of the loop. Thus, tightening causes pressure on the glue dot which promotes adhesive bonding.

According to a second alternative, the lacing is first tightened by pulling on the two strands, then the first glue dot is deposited astride the peak of the loop and the strands to produce a stop by adhesively bonding the lacing.

According to a possible feature relating to the two aforementioned alternatives, a second glue dot is deposited onto the lacing (that is to say onto the portion of strip surrounding the bundle) at a distance from the peak of the loop and the strands are folded back onto the second glue dot, the second glue dot thus holding the strands in the folded-back position.

Preferably, a glue with fast setting of less than or equal to 3 seconds, such as a cyanoacrylate glue, is then used for the second glue dot. The second glue dot has the function of keeping the strands folded back and the lacing tight (with the desired tension) while the first glue dot cures. This allows to use, for the first glue dot, a glue whose setting is considered too slow (because it takes more than 3 seconds), in particular a glue resistant to high temperatures, for example above 85° C.

As previously mentioned, lacing the strip around the cable bundle can consist of making a sliding link around said bundle. Other aspects are possible. Thus for example, lacing the strip can consist in wrapping the strip around the bundle, the tightening of the lacing preferably taking place as the wrapping progresses.

The wrapping can be carried out so as to make several turns around the cable bundle, for example two or three turns. The number of turns and the offset between two consecutive turns along the axis of the cable bundle can be determined according to the width desired for the binding. For a "relatively wide" binding (comprising for example five to six turns), two glue dots can be provided, namely a glue dot on the first turn to stop an upstream end of the lacing and a glue dot on the last turn to stop a downstream end of the lacing. The "first glue dot" previously defined then corresponds to the downstream glue dot deposited onto the last turn of the wrapping. The upstream glue dot deposited onto the first turn is optional, the upstream end of the strip can be trapped (and thus held) by the following wrapping turns.

According to a possible feature of the disclosure, a fast-setting crystalline glue is used (for the first glue dot). Preferably, this glue is selected from cyanoacrylate glues and photoactive glues.

Crystalline glues, and in particular cyanoacrylate glues, have the advantage of being durable; their structure is intact after 40 years or more, unlike certain two-component glues which disintegrate over time.

Choosing a quick-setting glue allows to offer a quick, and therefore less expensive, method, while controlling and guaranteeing the final tightening of the lacing.

It is possible to use glues whose curing requires exposure of the glue to ultraviolet or infrared radiation.

According to a possible feature of the disclosure, the binding method comprises a final step of sectioning excess strip strands.

This step may be optional, in particular if the method is automated. In this case, if the lacing requires the use of a pre-cut piece of strip, it is easy to provide a length of strip corresponding to the length necessary for said lacing, possibly increased by a gripping section allowing the automaton to handle the piece of strip; this gripping section can be reduced to the strict minimum, to approximately 10 mm (much less than that necessary for human handling in the case of a non-automated method, and which is approximately 250 mm); the gripping section can ultimately be left on the bound cable bundle so that no final step of sectioning excess strands is then planned, which further reduces the execution time (and costs) of the method.

BRIEF DESCRIPTION OF THE FIGURES

The disclosure, according to an exemplary aspect, will be well understood and its advantages will appear better upon reading the detailed description which follows, given in an indicative and non-limiting manner, with reference to the appended drawings wherein.

DETAILED DESCRIPTION

The identical elements shown in the aforementioned figures are identified by identical numerical references.

Figure 1:
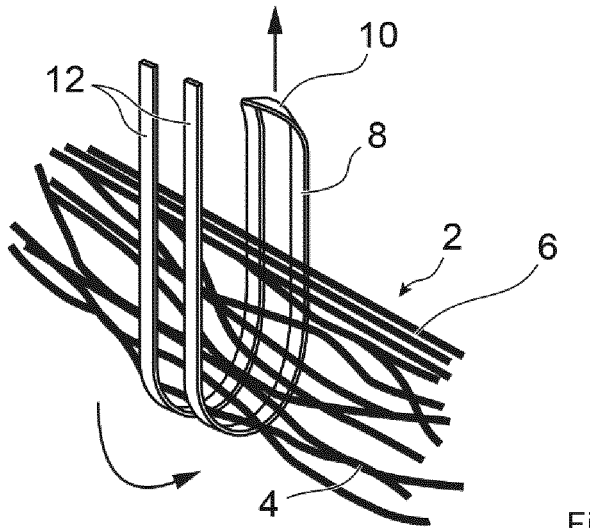
FIG. 1 illustrates a first step of a first aspect of the binding method according to the disclosure on a bundle seen in perspective.

FIG. 1 shows a cable bundle 2, which comprises a plurality of wires twisted so as to form one or more strands 4 as well as a plurality of parallel cables 6. Of course, this is in no way limiting, and the method according to the disclosure applies to all types of cable bundles, in particular bundles comprising only parallel cables or wires or comprising, conversely, only twisted strands.

Figure 2:
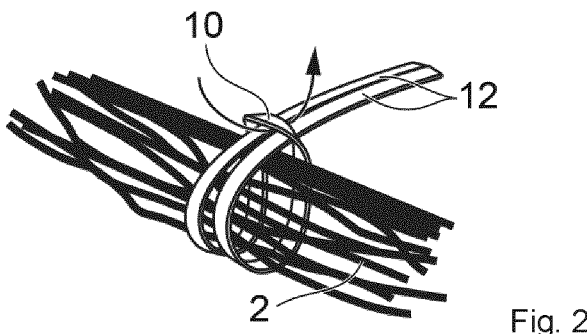
FIG. 2 illustrates a second step of this first aspect.
Figure 3:
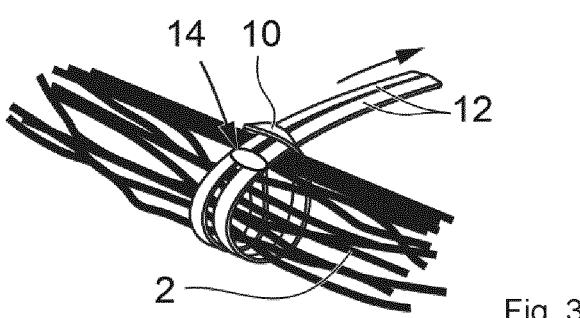
FIG. 3 illustrates a third step of this first aspect.
Figure 4:
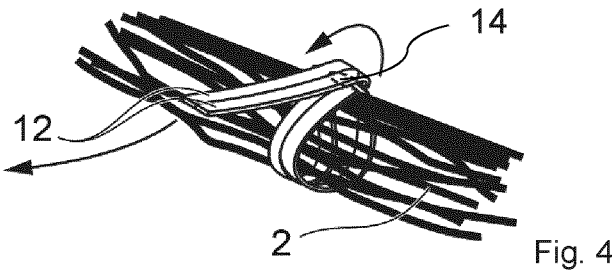
FIG. 4 illustrates a fourth step of this first aspect.

According to a first aspect of the disclosure, to produce a binding on such a bundle, it can be proceeded as follows:

a piece of strip 8 is folded in two so as to form a loop 10 delimited by two strands 12, a turn is carried out with the piece of looped strip 8 around the bundle 2 as illustrated in FIG. 1, the two strands 12 of the strip are passed inside the loop 10 (FIG. 2), thus forming a sliding link around the bundle 2 with the piece of looped strip, a pre-tightening consisting in pulling on the strands in the direction indicated by the arrow drawn in FIG. 3 can be carried out at this stage;

a first glue dot (or bead or drop) 14 is deposited onto the two strands 12 (FIG. 3), near the peak of the loop 10, on the side of the latter (that is to say the side opposite the free ends of the strands 12), that is to say near the peak of the loop onto the portion of strip which surrounds the bundle 2; for example, a fast-setting crystalline glue such as a cyanoacrylate-based glue is used;

then the sliding link is immediately tightened, before the glue sets, by pulling on the two strands 12 in the direction indicated by the arrow drawn in FIG. 4. In doing so, the first glue dot 14 approaches the peak of the loop and becomes trapped between the peak of the loop and the strands (FIG. 4). Tightening also contributes to spreading the adhesively bonded area. As it hardens, the glue dot fixes the peak of the loop 10 on the strands 12 and keeps the lacing closed and tight. The fast setting of the glue ensures that the clamping force applied when pulling on the strands remains the same after the glue has cured when the strands are released.

Unlike the strip used in the method disclosed by EP1569856 and the link used in the method disclosed by GB2528928, the strip 8 used according to the disclosure is a simple strip, for example a flat wire or a band of fabric, preferably of constant width, devoid of buckle and hook type attachment surface and devoid of adhesive surfaces, which reduces the cost price compared to the tape of EP1569856 and the link of GB2528928. The strip 8 is also more flexible and less bulky than that disclosed by EP1569856.

The strip 8 can advantageously be cut from a spool of very long strip, unlike the aforementioned previous strip and link. The execution times and costs generated by the method according to the disclosure are incommensurate with those of the methods of EP1569856 and GB2528928.

Furthermore, the way wherein the lacing is thus tightened according to the disclosure generates little or no MSD. The possibility of automating the method allows to eliminate them completely.

The production of such a binding only takes 8 seconds if it is carried out manually, and 4 seconds if it is carried out by a machine, an incompressible duration of 3 seconds being necessary for the curing of the glue. These durations should be compared to the 18 seconds required to produce a front binding with a capstan knot stopped by a simple knot.

In manual mode, a saving of 10 seconds per binding represents, for one million bindings installed, a saving of 2778 hours of work.

Moreover, the method illustrated allows a reduction in offcuts of binding tape of 10 cm per binding, that is to say a saving of 100 km of tape for one million bindings.

Other aspects of the disclosure are possible, since the production of the binding comprises lacing, tightening of the lacing and stopping by depositing at least one glue dot (called first glue dot) for adhesively bonding the lacing to itself, without it being necessary to make a single self-locking knot.

For example, the lacing of the strip around the bundle can be carried out differently, for example by wrapping.

Moreover, the method according to the disclosure may include the application of a second glue dot as explained below with reference to FIG. 5.

Figure 5:
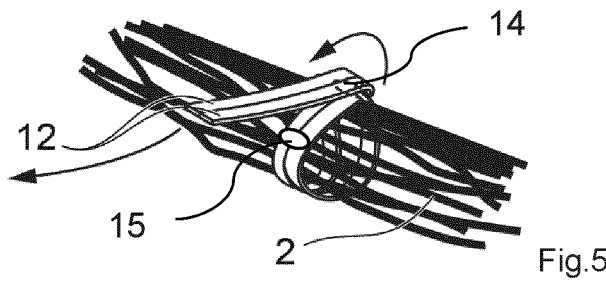
FIG. 5 illustrates the fourth step of a second aspect which comprises steps 1 to 3 identical to the first aspect.

FIG. 5 illustrates the fourth step of a second aspect of the disclosure wherein the steps illustrated in FIGS. 1 to 3 are first carried out, in the same way as for the first aspect. In this second aspect, two glue dots are deposited onto the lacing, namely: the first glue dot 14 which is deposited near the peak of the loop 10 before tightening the lacing; and a second glue dot 15 deposited at a distance from the peak of the loop onto the portion of the strip which surrounds the bundle. This second glue dot can be deposited before or optionally after tightening the lacing. The free portion of the strip (free end of the strands 12) is then (after tightening) folded over the second glue dot 15.

The second glue dot 15 allows to hold the strands 12 in the folded-back position and the lacing tight while the first glue dot 14 cures. This allows to use, for the first glue dot, a glue whose setting is considered too slow because it is for example greater than 3 seconds, for example a glue able to withstand high temperatures, in particular above 85° C., which is not the case with known cyanoacrylate glues.

So that the method remains quick to be carried out, the glue used for the second glue dot 15 is on the other hand selected from glues with a fast setting of less than 3 seconds, such as cyanoacrylate glues. It does not matter that this second glue dot 15 is then, during use, weakened by exposure of the bundle to a temperature above 85° C., the hold and tightening of the binding remaining ensured by the first glue dot 14.

What is claimed is:

1. A method for binding a cable bundle, without a self-locking knot, using a strip having two free portions and a first drop of glue, the method comprises:

wrapping the strip around the cable bundle;

tightening the strip about the cable bundle; and applying the first drop of glue onto the strip to produce a stop by adhesively bonding the two free portions to one another.

2. The method according to claim 1, characterized in that, once the wrapping of the strip has been carried out, the strip has a part of strip wound around the bundle and the two free portions, and in that:

the first glue dot is deposited onto the part of strip wound around the bundle, the two free portions of the strip are folded back onto the first glue dot, producing the stop by adhesively bonding the two free portions to one another.

3. The binding method according to claim 1, characterized in that lacing wrapping the strip around the cable bundle consists in forming a sliding link around the bundle, and in that the two free portions are is adhesively bonded by the first glue dot at the sliding link.

4. The binding method according to claim 3, characterized in that wrapping the strip around the bundle consists in forming a loop delimited by two free portions with a piece of strip, winding the loop around the cable bundle and introducing the two free portions of the strip into the loop, tightening the strip then consisting in pulling on the two free portions.

5. The binding method according to claim 4, characterized in that, once the two free portions have been introduced into the loop, the first glue dot is deposited onto the two free portions near a peak of the loop on a portion of strip surrounding the bundle, to subsequently obtain the stop by adhesively bonding the strip, then the strip is tightened by pulling on the two free portions, the first glue dot thus becoming trapped between the two free portions and the peak of the loop.

6. The method according to claim 5, characterized in that a second glue dot is deposited onto the strip at a distance from the peak of the loop and the two free portions are folded back onto the second glue dot, the second glue dot thus holding the two free portions in the folded-back position.

7. The method according to claim 6, characterized in that use is made of:

a glue with fast setting of less than or equal to 3 seconds, for the second glue dot, and a glue resistant to high temperatures, for example above 85° C., for the first glue dot.

8. The method according to claim 4, characterized in that the strip is tightened by pulling on the two free portions then the first glue dot is deposited astride a peak of the loop and the two free portions to produce the stop by adhesively bonding the strip.

9. The binding method according to claim 1, characterized in that the wrapping of the strip consists in wrapping the strip around the bundle, the tightening of the strip taking place as the wrapping progresses.

10. The binding method according to claim 1, characterized in that a fast-setting crystalline glue selected from cyanoacrylate glues and photoactive glues is used for the first glue dot.

11. The binding method according to claim 1, characterized in that it comprises a final step of sectioning excess strip free portions.

* * * * *